United States Patent
Chino et al.

(10) Patent No.: US 12,012,152 B2
(45) Date of Patent: Jun. 18, 2024

(54) VEHICLE BODY REAR STRUCTURE

(71) Applicant: HONDA MOTOR CO., LTD., Tokyo (JP)

(72) Inventors: Shungo Chino, Tokyo (JP); Yuya Akaba, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 385 days.

(21) Appl. No.: 17/591,627

(22) Filed: Feb. 3, 2022

(65) Prior Publication Data

US 2022/0281533 A1    Sep. 8, 2022

(30) Foreign Application Priority Data

Mar. 4, 2021    (JP) .................................. 2021-034596

(51) Int. Cl.
   *B62D 25/20*    (2006.01)
   *B62D 25/08*    (2006.01)

(52) U.S. Cl.
   CPC ....... *B62D 25/2027* (2013.01); *B62D 25/088* (2013.01); *B62D 25/2036* (2013.01)

(58) Field of Classification Search
   CPC .............. B62D 25/2027; B62D 25/088; B62D 25/2036; B62D 21/11; B62D 21/157; B62D 25/08; B60G 7/008; B60J 5/0461
   See application file for complete search history.

(56) References Cited

U.S. PATENT DOCUMENTS

| | | |
|---|---|---|
| 9,156,501 B2 | 10/2015 | Mildner et al. |
| 9,156,504 B2 | 10/2015 | Terada et al. |
| 10,112,653 B2 * | 10/2018 | Abe ..................... B62D 25/025 |
| 2005/0088017 A1 | 4/2005 | Haewoong |
| 2009/0146455 A1 | 6/2009 | Honji et al. |
| 2013/0161978 A1 | 6/2013 | Herntier et al. |

(Continued)

FOREIGN PATENT DOCUMENTS

| | | |
|---|---|---|
| CN | 1608920 | 4/2005 |
| CN | 101450685 | 6/2009 |

(Continued)

OTHER PUBLICATIONS

English translation of WO 2016076315 A1 (Year: 2016).*

(Continued)

*Primary Examiner* — Lori Lyjak

(74) *Attorney, Agent, or Firm* — Amin, Turocy & Watson, LLP

(57) ABSTRACT

A vehicle body rear portion includes a side sill, a rear side frame, a cross member, a side door, a trailing arm, an arm attachment bracket, and a bracket reinforcement member. The side door includes a door beam disposed at a position overlapping an outer side of the side sill in a vehicle width direction. The trailing arm has a front end portion that is swingably supported by a front region of a rear side frame via a mounting member. The bracket reinforcement member has an outer end portion in the vehicle width direction that is directly or indirectly coupled to an internal angle portion above the side sill, and an inner end portion in the vehicle width direction that is directly or indirectly coupled to an outer end portion of the cross member in the vehicle width direction.

10 Claims, 11 Drawing Sheets

(56) References Cited

U.S. PATENT DOCUMENTS

| | | | |
|---|---|---|---|
| 2017/0106914 A1* | 4/2017 | Abe | B62D 21/157 |
| 2022/0281529 A1 | 9/2022 | Chino | |
| 2022/0281533 A1 | 9/2022 | Chino et al. | |

FOREIGN PATENT DOCUMENTS

| | | | |
|---|---|---|---|
| CN | 203255264 | 10/2013 | |
| CN | 110171477 | 8/2019 | |
| DE | 19744664 | 6/1998 | |
| JP | 2007-290665 | 11/2007 | |
| JP | 2010-132026 | 6/2010 | |
| JP | 4478662 | 6/2010 | |
| JP | 2012-076703 | 4/2012 | |
| JP | 3185492 | 8/2013 | |
| JP | 5426614 | 2/2014 | |
| JP | 2014-113909 | 6/2014 | |
| JP | 2016-107848 | 6/2016 | |
| JP | 2016-215666 | 12/2016 | |
| JP | 2017071232 A * | 4/2017 | B62D 25/08 |
| JP | 2017-136869 | 8/2017 | |
| JP | 2017-210141 | 11/2017 | |
| JP | 2018-203044 | 12/2018 | |
| JP | 2018-203055 | 12/2018 | |
| WO | 2012/001932 | 1/2012 | |
| WO | WO-2016076315 A1 * | 5/2016 | B62D 21/03 |
| WO | WO-2018016173 A1 * | 1/2018 | B62D 21/152 |

OTHER PUBLICATIONS

Chinese Notice of Allowance for Chinese Patent Application No. 202210116775.X mailed May 31, 2023.
Chinese Office Action for Chinese Patent Application No. 202210141137.3 mailed Nov. 7, 2023.
Japanese Notice of Allowance for Japanese Patent Application No. 2021-034596 mailed Oct. 4, 2022.
Japanese Notice of Allowance for Japanese Patent Application No. 2021-034622 mailed Oct. 4, 2022.
Non-Final Office Action for U.S. Appl. No. 17/673,838 mailed Jan. 19, 2023.

* cited by examiner

VEHICLE BODY REAR STRUCTURE

CROSS-REFERENCE TO RELATED APPLICATION

Priority is claimed on Japanese Patent Application No. 2021-034596, filed on Mar. 4, 2021, the contents of which are incorporated herein by reference.

BACKGROUND

Field of the Invention

The present invention relates to a vehicle body rear structure including a trailing arm for a rear wheel suspension.

Background

In a vehicle including a trailing arm type rear wheel suspension apparatus, an arm insertion hole is formed in a lower wall of a front region of a rear side frame, and a front end side of a trailing arm that supports a rear wheel at a rear portion is inserted through the arm insertion hole. The front end portion of the trailing arm is swingably supported in a cross section of the front region of the rear side frame via a mounting member in which an elastic rubber body is installed. The front region of the rear side frame is coupled to an inner side in a vehicle width direction of a side sill disposed below a side portion of a passenger compartment (for example, see Japanese Patent No. 4478662).

In the vehicle body rear structure disclosed in Japanese Patent No. 4478662, an arm attachment bracket having a dome-shaped portion that is open downward is fixed into the cross section of the front region of the rear side frame. Fixing nuts are provided on left and right side portions of the dome-shaped portion of the arm attachment bracket, and a shaft portion of a mounting member is fastened to left and right fixing nuts by bolts. An upper side of the mounting member is covered with the dome-shaped portion in this state. In addition, a reinforcement member connected to left and right sidewalls of a rear side frame is disposed above the arm attachment bracket in the cross section of the front region of the rear side frame, and upper portions of left and right fixing nuts are supported by the reinforcement member. Further, the front region of the rear side frame is coupled to an inner side portion of the side sill in the vehicle width direction. Left and right side sills of the vehicle body are connected to each other by a cross member extending in the vehicle width direction in front of a support portion of the mounting member of the rear side frame of the vehicle. In addition, an extension portion extending to the front side of the vehicle crossing a lower surface of the cross member is provided on the front end portion of the rear side frame, and the extension portion is coupled to the cross member and the lower region of the side sill.

In the vehicle body front structure disclosed in Japanese Patent No. 4478662, since the extension portion of the front end side of the rear side frame is connected to the lower region of the side sill below the cross member, the inner region of the side sill in the vehicle width direction is supported by an end surface of the cross member and the extension portion of the rear side frame within a wide range in the upward/downward direction. For this reason, when an impact load is input toward an inner side in the vehicle width direction to the side sill, occurrence of a rotational moment around an axial center (a center of gravity) of the side sill can be minimized, and an input load can be efficiently transmitted to the cross member. Accordingly, energy of the input impact load can be efficiently absorbed by deformation of the cross member or peripheral members thereof.

SUMMARY

However, in the vehicle body front structure disclosed in Japanese Patent No. 4478662, since the inner region of the side sill in the vehicle width direction is supported by the cross member and the extension portion of the rear side frame in the upward/downward direction, a structure around the connecting portion between the front region of the rear side frame and the side sill is increased in size. At present, from the viewpoint of reducing the weight of the vehicle, reduction in size and weight around the connecting portion between the front region of the rear side frame and the side sill is desired.

An aspect of the present invention is directed to providing a vehicle body rear structure in which reduction in size and weight around a connecting portion between a front region of a rear side frame and a side sill is possible while maintaining high energy absorption performance with respect to an impact load input from a vehicle body side portion.

A vehicle body rear structure according to an aspect of the present invention includes a side sill disposed below a side portion of a passenger compartment substantially in a vehicle forward/rearward direction; a rear side frame having a front region coupled to an inner side of a rear portion of the side sill in a vehicle width direction and an arm insertion hole provided on a lower wall of the front region; a cross member extending substantially in a vehicle width direction and having an outer end portion in the vehicle width direction connected to the front region of the rear side frame; a side door in which a door beam is installed at a position overlapping an outer side of the side sill in the vehicle width direction; a trailing arm configured to support a rear wheel on a side of the rear portion and having a front end portion inserted through the arm insertion hole of the rear side frame and swingably supported by the front region of the rear side frame via a mounting member; an arm attachment bracket having a dome-shaped portion that covers the mounting member from above and fixed into a cross section of the front region of the rear side frame to support the mounting member; and a bracket reinforcement member attached to the arm attachment bracket and configured to reinforce the arm attachment bracket, and the bracket reinforcement member has an outer end portion in the vehicle width direction that is directly or indirectly coupled to a vicinity of an internal angle portion above the side sill, and an inner end portion in the vehicle width direction that is directly or indirectly coupled to an outer end portion of the cross member in the vehicle width direction.

In the above-mentioned configuration, when an impact load directed to an inner side in the vehicle width direction is input from an outer side of the side door, the impact load is input to the side sill via the door beam. The impact load input to the side sill is transmitted to the cross member through the bracket reinforcement member. For this reason, the impact load input to the side door can be transmitted to the cross member through the side sill and the bracket reinforcement member, and energy of the impact load can be absorbed by these members. In addition, when the load input to the side sill from the door beam is shifted to above an axial center of the side sill in the vehicle body forward/rearward direction, a rotational moment applied to surroundings of the axial center of the side sill can be received by the bracket reinforcement member. Accordingly, when the configuration is employed, collapse of the side door on the side of the upper portion by the rotational moment can be efficiently suppressed.

The bracket reinforcement member may be disposed above a center of gravity of the side sill.

In this case, the rotational moment applied to surroundings of the axial center (center of gravity) of the side sill can be received by the bracket reinforcement member. For this reason, even when the impact load is input to the side sill above the center of gravity, collapse of the side door by the rotational moment on the side of the upper portion can be efficiently suppressed, and energy of the impact load can be efficiently absorbed by the side sill, the front region of the rear side frame, the bracket reinforcement member, the cross member, and the like.

The bracket reinforcement member may be a substantially L-shaped cross-sectional plate-shaped member having a vertical standing wall with an oblique side inclined downward from an outer side toward an inner side in the vehicle width direction and a substantially right triangular shape when seen in a front view, and an upper end bent flange extending to be bent from an upper end portion of the vertical standing wall in the vehicle forward/rearward direction, an outer flange fixed to an inner side surface of the side sill in the vehicle width direction may be provided on an outer end portion of the vertical standing wall in the vehicle width direction, an outer extension wall fixed to an upper wall connected to the internal angle portion of the side sill may be provided on an outer end portion of the upper end bent flange in the vehicle width direction, and an inner extension wall fixed to an upper surface of an inner flange of the rear side frame in the vehicle width direction may be provided on an inner end portion of the upper end bent flange in the vehicle width direction.

In this case, the bracket reinforcement member can be lowered from above to below an assembly of the rear side frame and the side sill, the outer extension wall and the inner extension wall of the bracket reinforcement member can be placed on the upper surfaces of the upper wall of the side sill and the inner flange of the rear side frame, and the respective parts of the bracket reinforcement member can be easily joined to the side sill and the rear side frame in this state through spot welding or the like. In addition, in the bracket reinforcement member joined to the side sill and the rear side frame in this way, an oblique side of a vertical standing wall having a substantially right triangular shape connects an internal angle portion above the side sill and an inner region (inner flange) of the rear side frame in the vehicle width direction. For this reason, the rotational moment applied to the side sill from the door beam upon input of the impact load can be efficiently received by the cross member through the vertical standing wall of the bracket reinforcement member and the inner flange of the rear side frame.

The vertical standing wall may have a concave portion fitted onto an outer side surface of the dome-shaped portion of the arm attachment bracket, and a lower side bent flange joined to the outer side surface of the dome-shaped portion may be formed on an edge portion of the concave portion.

In this case, the rotational moment applied to the side sill from the door beam upon input of the impact load can also be received by the dome-shaped portion of the arm attachment bracket through the vertical standing wall and the lower side bent flange of the bracket reinforcement member. Accordingly, the upper region of the side door can be further suppressed from collapsing into the vehicle. In addition, the impact load directed toward the inner side in the vehicle width direction transmitted to the dome-shaped portion through the concave portion of the bracket reinforcement member can be efficiently transmitted to the inner region (inner flange) of the rear side frame in the vehicle width direction through the lower side bent flange located at an inner side of the dome-shaped portion in the vehicle width direction and the vertical standing wall portion continuous with an inner side of the lower side bent flange in the vehicle width direction.

A fixing nut configured to fasten the mounting member to the arm attachment bracket using a bolt may be attached to the arm attachment bracket, and the bracket reinforcement member may be fixed to the arm attachment bracket and the fixing nut.

In this case, the bracket reinforcement member can be integrated with the arm attachment bracket, and the fixing nut attached to the arm attachment bracket can be strongly supported by the bracket reinforcement member. As a result, support strength of the trailing arm can be increased, and when the impact load is input from the side of the vehicle, the impact load can be distributed in and supported by the arm attachment bracket or the trailing arm via the bracket reinforcement member.

A bracket support plate extending in the vehicle forward/rearward direction and the vehicle width direction and configured to support the arm attachment bracket may be fixed into a cross section of the front region of the rear side frame, a communication port configured to bring a downward opening of the dome-shaped portion of the arm attachment bracket in communication with the arm insertion hole of the rear side frame may be provided on the bracket support plate, and a bulkhead extending downward from the front edge portion and configured to connect the cross section of the front region of the rear side frame and the side sill may be coupled to a front edge portion of the bracket support plate.

In this case, the front region of the rear side frame is supported by the lower region of the side sill with high rigidity via the front edge portion of the bracket support plate and the bulkhead. Accordingly, rigidity of the coupling portion between the rear side frame and the side sill is increased. In addition, when the impact load is input to the rear side frame from the rear side of the vehicle, the input load can be efficiently transmitted to the side sill via the bracket support plate and the bulkhead.

A main part of the rear side frame may be formed in a substantially C-shaped cross-sectional shape that opens upward, a closing plate that forms a closed cross section together with the rear side frame may be coupled to the rear side frame, and an upper portion of the bracket reinforcement member may be coupled to the closing plate.

In this case, since the bracket reinforcement plate is integrated with the closing plate that forms the closed cross section together with the rear side frame, support strength of the trailing arm can be increased.

In addition, when the impact load is input to the rear side frame from the rear side of the vehicle, the input load can be transmitted to the bracket reinforcement member through not only the rear side frame but also the closing plate. Accordingly, the impact load from the rear side of the vehicle can be efficiently distributed in and supported by the side sill or the cross member through the bracket reinforcement member.

A load transmitting portion inclined downward toward an outer side in the vehicle width direction and facing an outer upper end portion of the bracket reinforcement member in the vehicle width direction may be provided in the cross section of the side sill, and an outer end portion of the load transmitting portion in the vehicle width direction may face the door beam.

In this case, when the impact load directed toward an inner side in the vehicle width direction is input to the side sill from the door beam, the load is efficiently transmitted to the bracket reinforcement member through the load transmitting portion in the cross section of the side sill. Accordingly, the input impact load can be more reliably received by the bracket reinforcement member and the cross member.

The inner extension wall of the bracket reinforcement member may be joined to an outer upper wall of the cross member in the vehicle width direction via the inner flange of the rear side frame.

In this case, the inner extension wall of the bracket reinforcement member overlaps the inner flange of the rear side frame and the outer upper wall of the cross member in the vehicle width direction, and the three members can be easily joined in a state of three layers through spot welding or the like. For this reason, productivity of the vehicle can be increased. In addition, since the three members are joined in the state of three layers, strength of the joining portion can be efficiently increased.

An extension portion extending to be perpendicular to an inner side surface of the rear side frame in the vehicle width direction and coupled to the rear side frame may be provided on an outer end portion of the cross member in the vehicle width direction, and a fragile portion may be provided in a part of the extension portion.

In this case, when the impact load is input to the side sill from the outer side in the vehicle width direction, the impact load is transmitted in an extension direction of the extension portion of the cross member via the rear side frame. For this reason, the impact load can be efficiently transmitted to the cross member from the side sill. In addition, when the impact load is input to the extension portion of the cross member via the rear side frame, the extension portion can be plastically deformed from the fragile portion as a starting point, and energy of the impact load can be efficiently absorbed.

In the vehicle body rear structure according to the aspect of the present invention, the end portion of the cross member extending substantially in the vehicle width direction is connected to the side sill via the front region of the rear side frame and the bracket reinforcement member. For this reason, the impact load input to the side door from the vehicle body side portion can be efficiently transmitted to the cross member from the side sill via the bracket reinforcement member. Accordingly, when the vehicle body rear structure according to the aspect of the present invention is employed, surroundings of the connecting portion between the front region of the rear side frame and the side sill can be reduced in size and weight while maintaining high energy absorption performance with respect to the impact load input from the vehicle body side portion.

In particular, in the vehicle body rear structure according to the aspect of the present invention, since the end portion of the cross member is connected to the internal angle portion above the side sill with high rigidity using the bracket reinforcement member that reinforces the arm attachment bracket, energy absorption performance with respect to the impact load input from the vehicle body side portion can be increased without causing an increase in the number of parts.

Further, in the vehicle body rear structure according to the aspect of the present invention, since the bracket reinforcement member couples the internal angle portion above the side sill and the outer end portion of the cross member in the vehicle width direction, the upper region of the side door can be suppressed from collapsing into the vehicle by the rotational moment due to the impact load input to the side sill through the door beam. Accordingly, when the vehicle body rear structure according to the aspect of the present invention is employed, collapsing of the side door upon input of the impact load can be suppressed while minimizing an increase in size of the support portion of the side sill.

DESCRIPTION OF EMBODIMENTS

Figure 1:
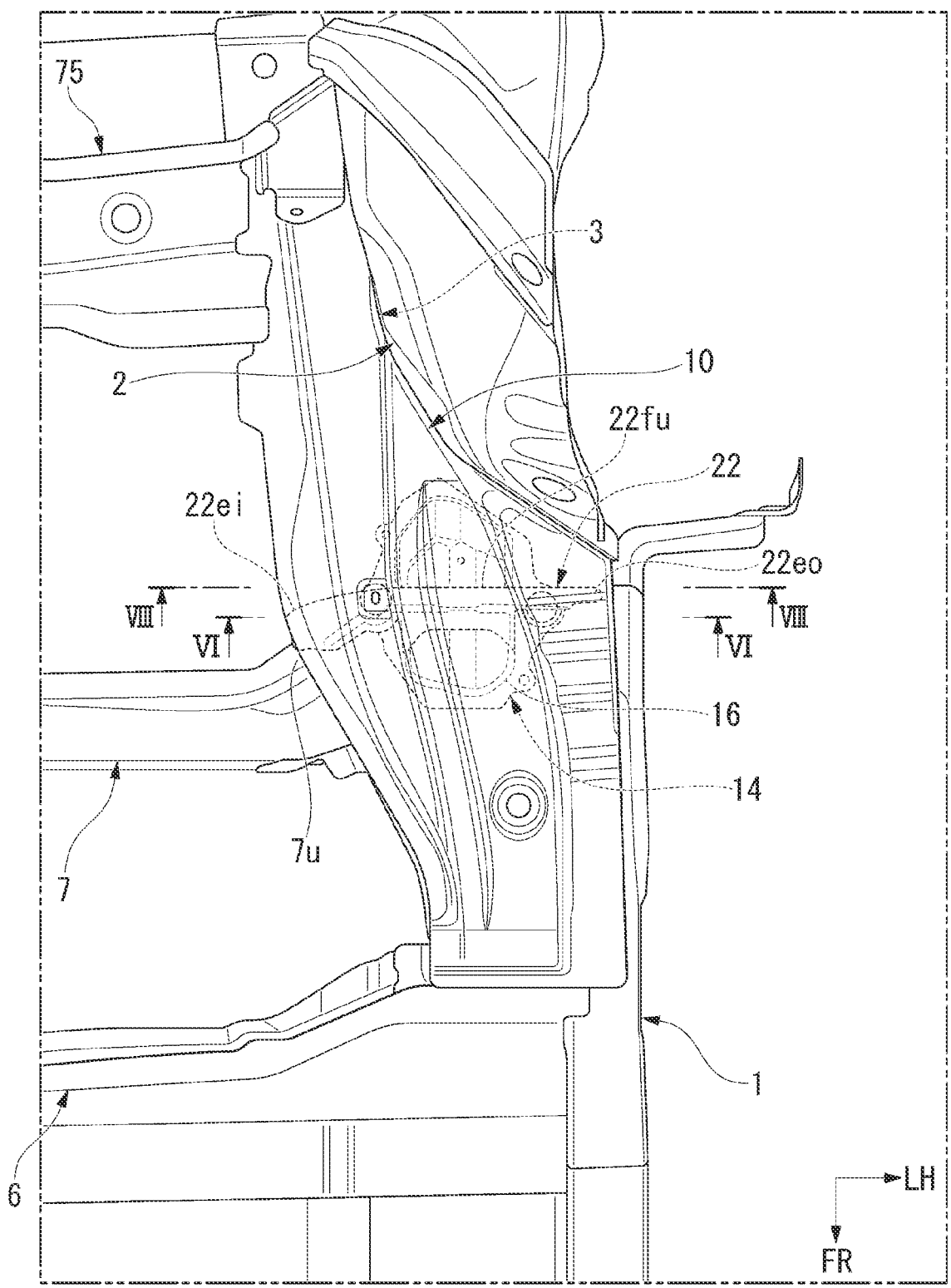
FIG. 1 is a plan view of a vehicle body rear portion of an embodiment.

Hereinafter, an embodiment of the present invention will be described with reference to the accompanying drawings. Further, directions of forward, rearward, upward, downward, leftward, and rightward in the following description are the same as directions in a vehicle described below unless the context clearly indicates otherwise. In addition, in appropriate places in the drawings, an arrow FR indicates a forward direction with respect to a vehicle, an arrow UP indicates an upward direction with respect to the vehicle, and an arrow LH indicates a leftward direction with respect to the vehicle.

Figure 2:
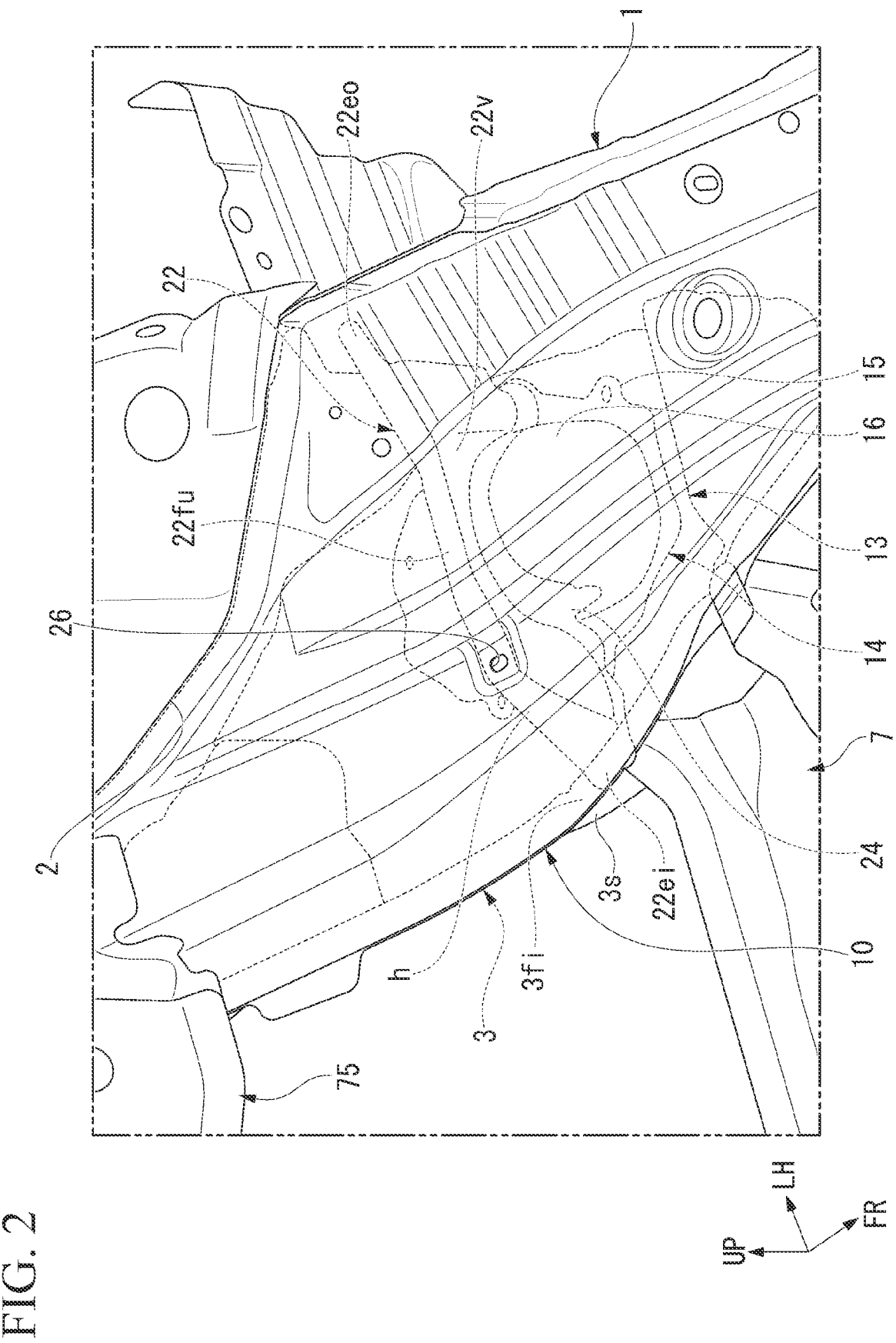
FIG. 2 is a perspective view of the vehicle body rear portion of the embodiment.
Figure 3:
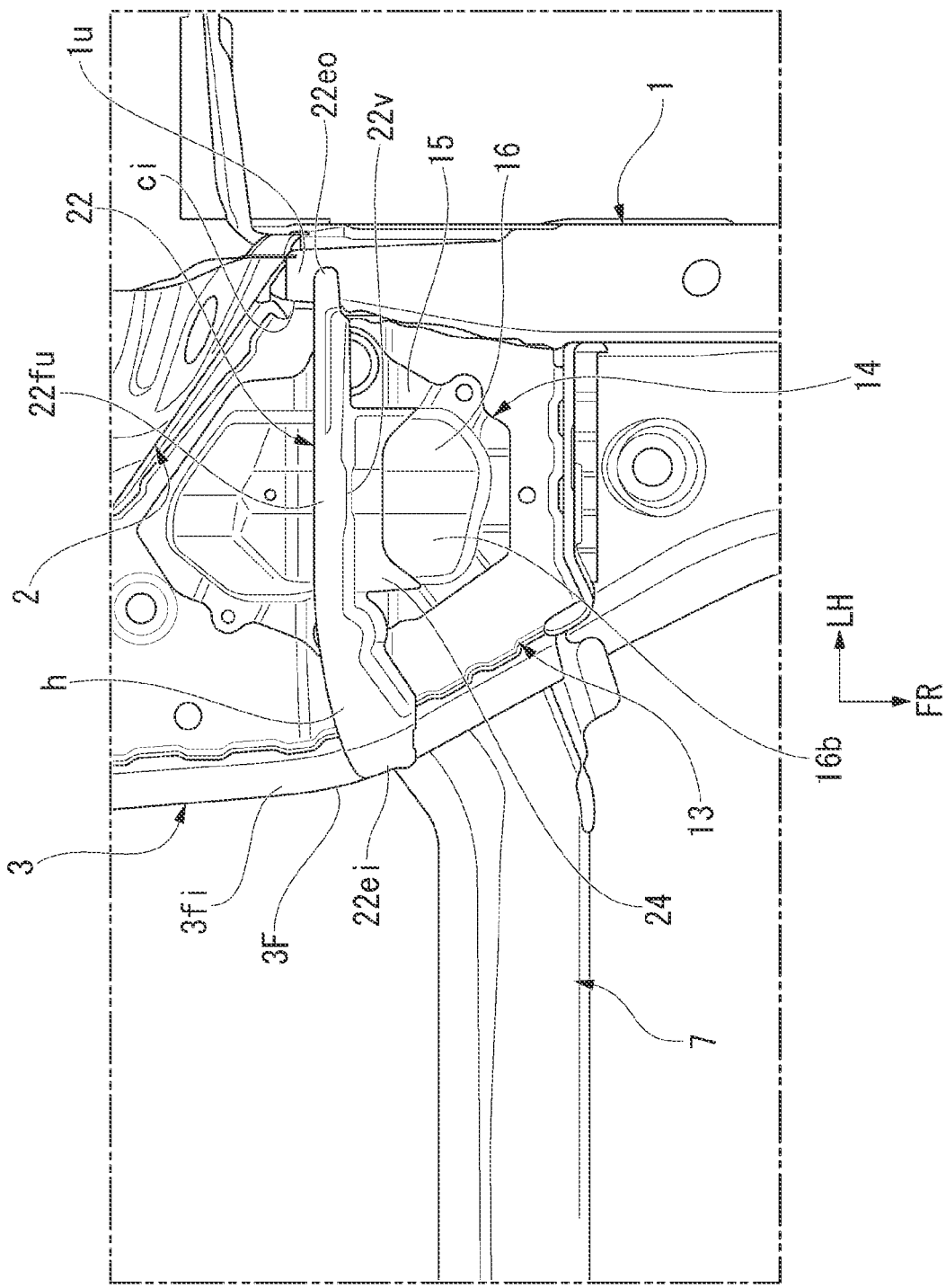
FIG. 3 is a plan view of the vehicle body rear portion of the embodiment, some parts of which are removed.
Figure 4:
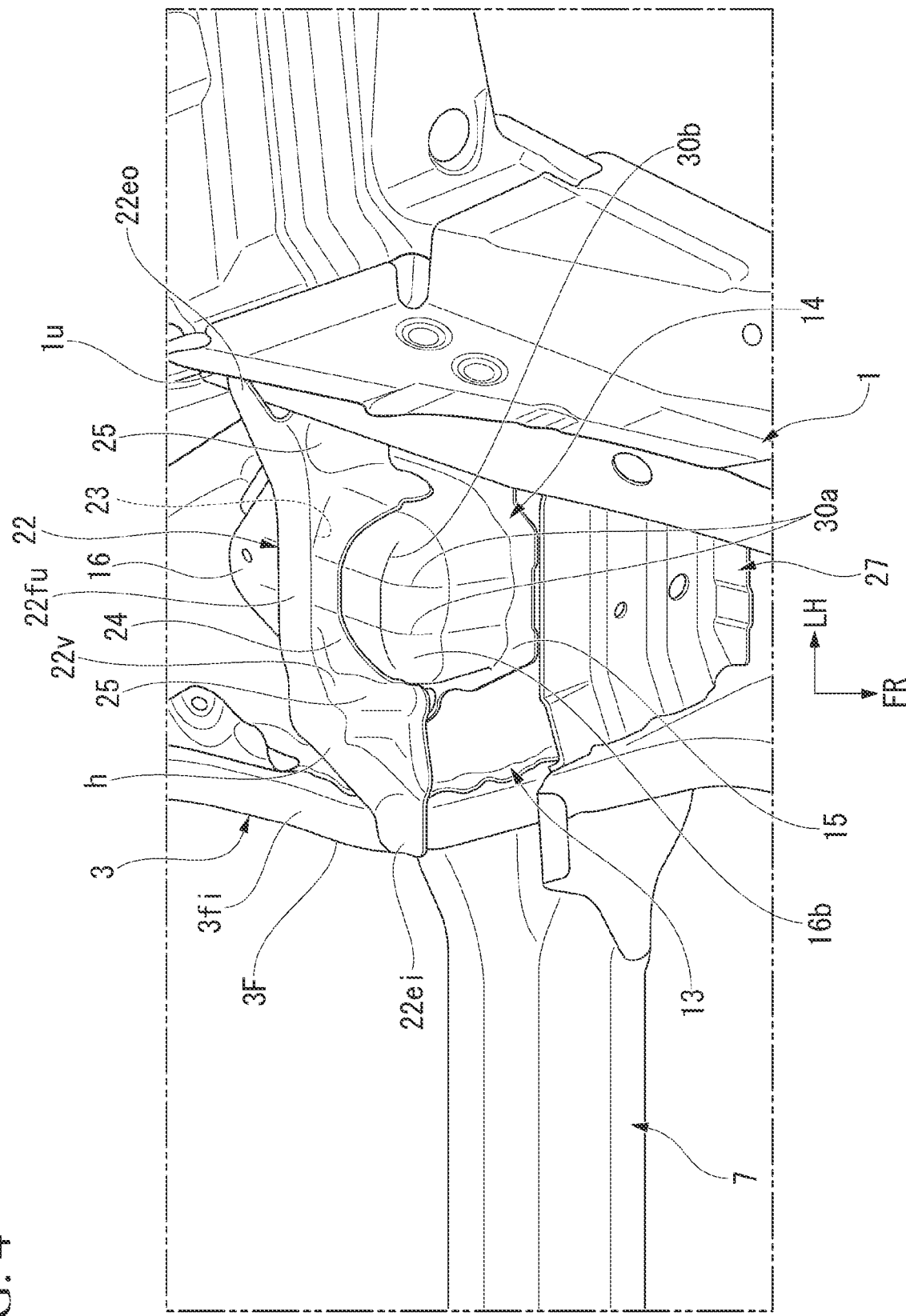
FIG. 4 is a perspective view of the vehicle body rear portion of the embodiment, some parts of which are removed.
Figure 5:
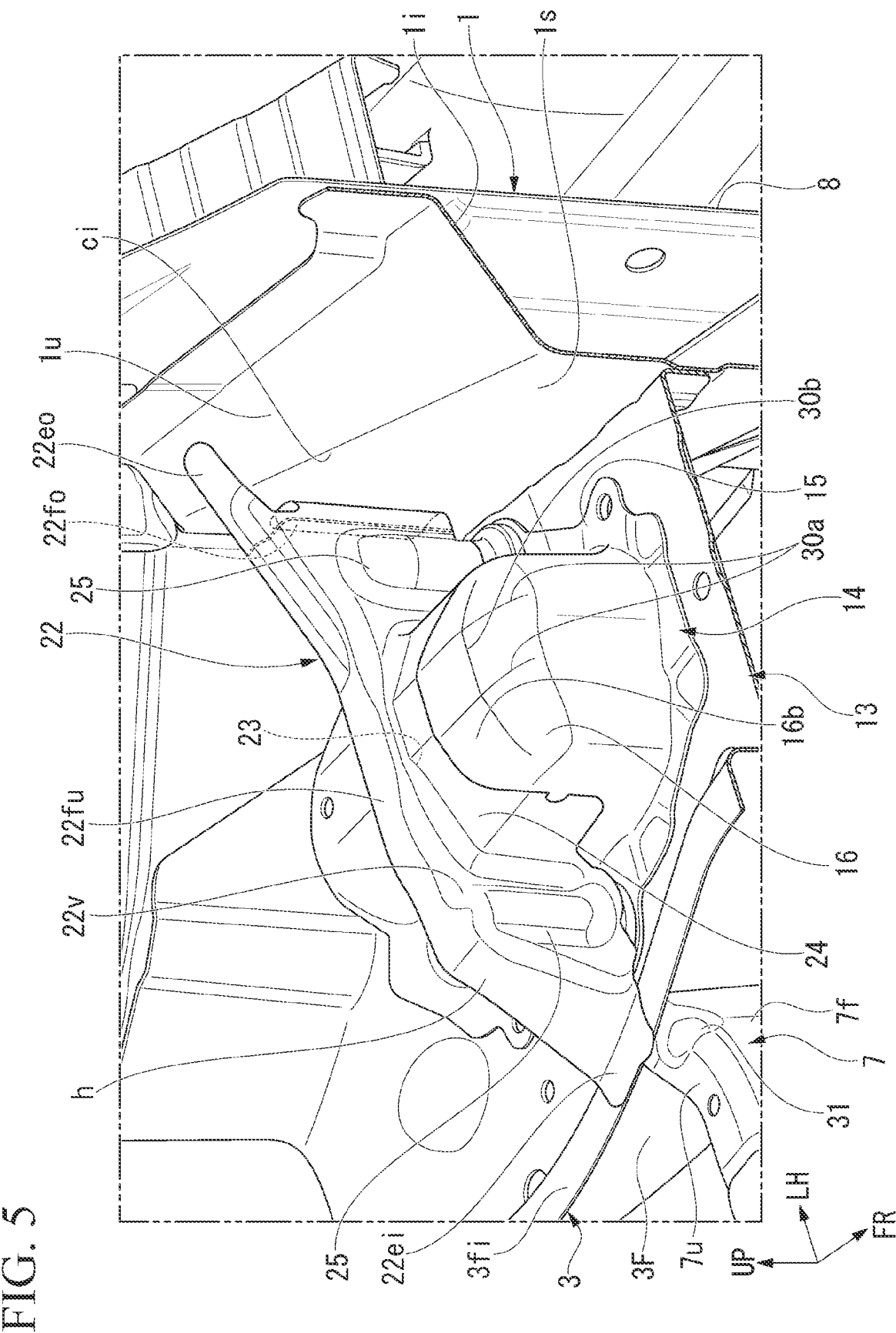
FIG. 5 is another perspective view of the vehicle body rear portion of the embodiment, some parts of which are removed.

FIG. 1 is a plan view showing a left frame portion of a vehicle body rear portion of a vehicle of an embodiment. FIG. 2 is a perspective view showing the same left frame portion as in FIG. 1 from obliquely above of a front right side. In addition, FIG. 3 is a plan view of the same left frame portion as in FIG. 1, some parts (a closing plate 10) of which are removed. FIG. 4 and FIG. 5 are perspective views, some parts (the closing plate 10) being removed from the same left frame portion as in FIG. 1. Further, FIG. 4 and FIG. 5 are views when the left frame portion is seen from different angles.

A right frame portion of the vehicle body rear portion is formed symmetrically to the left frame portion with a centerline of the vehicle in the widthwise direction sandwiched therebetween. For this reason, hereinafter, only the left frame portion will be described, and description of the right frame portion will be omitted.

Reference sign 1 in the drawings designates a side sill disposed below a side portion of a passenger compartment substantially in a vehicle forward/rearward direction. Reference sign 2 designates a rear wheel house (see FIG. 1 and FIG. 2) configured to cover surroundings of an upper side of a rear wheel (not shown) behind the side sill 1. A rear side frame 3 extending forward from the vehicle rear portion is disposed inside the rear wheel house 2 in the vehicle width direction. A horizontal cross section of the front portion of the rear wheel house 2 is formed to be curved to continuously cover the rear wheel from an inner end surface of the rear wheel in the vehicle width direction to a front surface side of the rear wheel. A main part of the rear side frame 3 is formed in a substantially C-shaped cross-sectional shape that opens upward. The closing plate 10 having almost the same shape as the shape when seen in a plan view of the rear side frame 3 is coupled to the upper portion of the rear side frame 3. The closing plate 10 closes an opening of the rear side frame 3 on an upper side.

A front region 3F of the rear side frame 3 is turned to the front side of the vehicle again after curving outside in the vehicle width direction along a curved shape of the front portion of the rear wheel house 2 (a curved shape in a horizontal cross section), and coupled to an inner side portion of the rear portion of the side sill 1 in the vehicle width direction.

Figure 6:
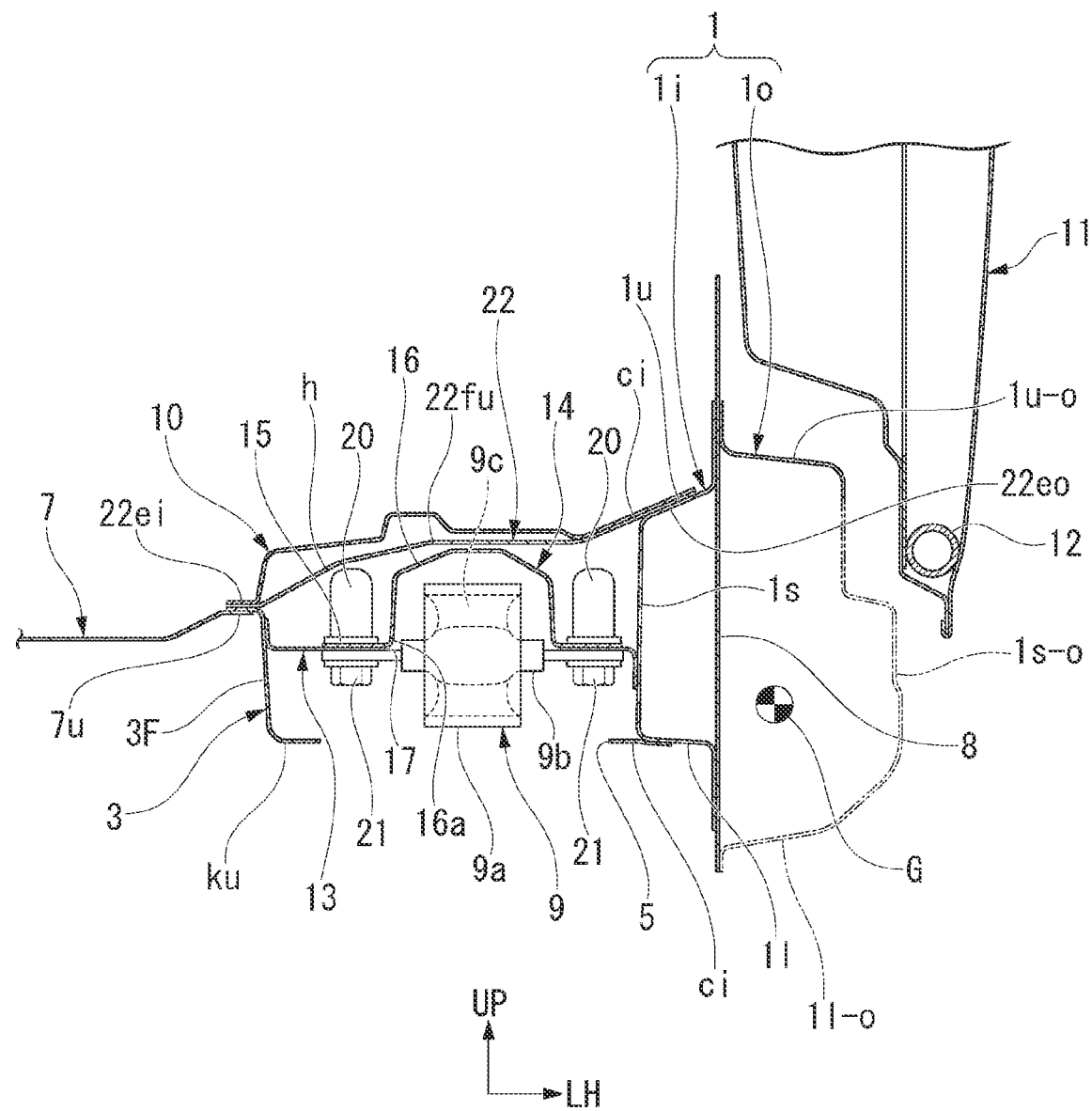
FIG. 6 is a cross-sectional view of the vehicle body rear portion of the embodiment taken along line VI-VI of FIG. 1.
Figure 7:
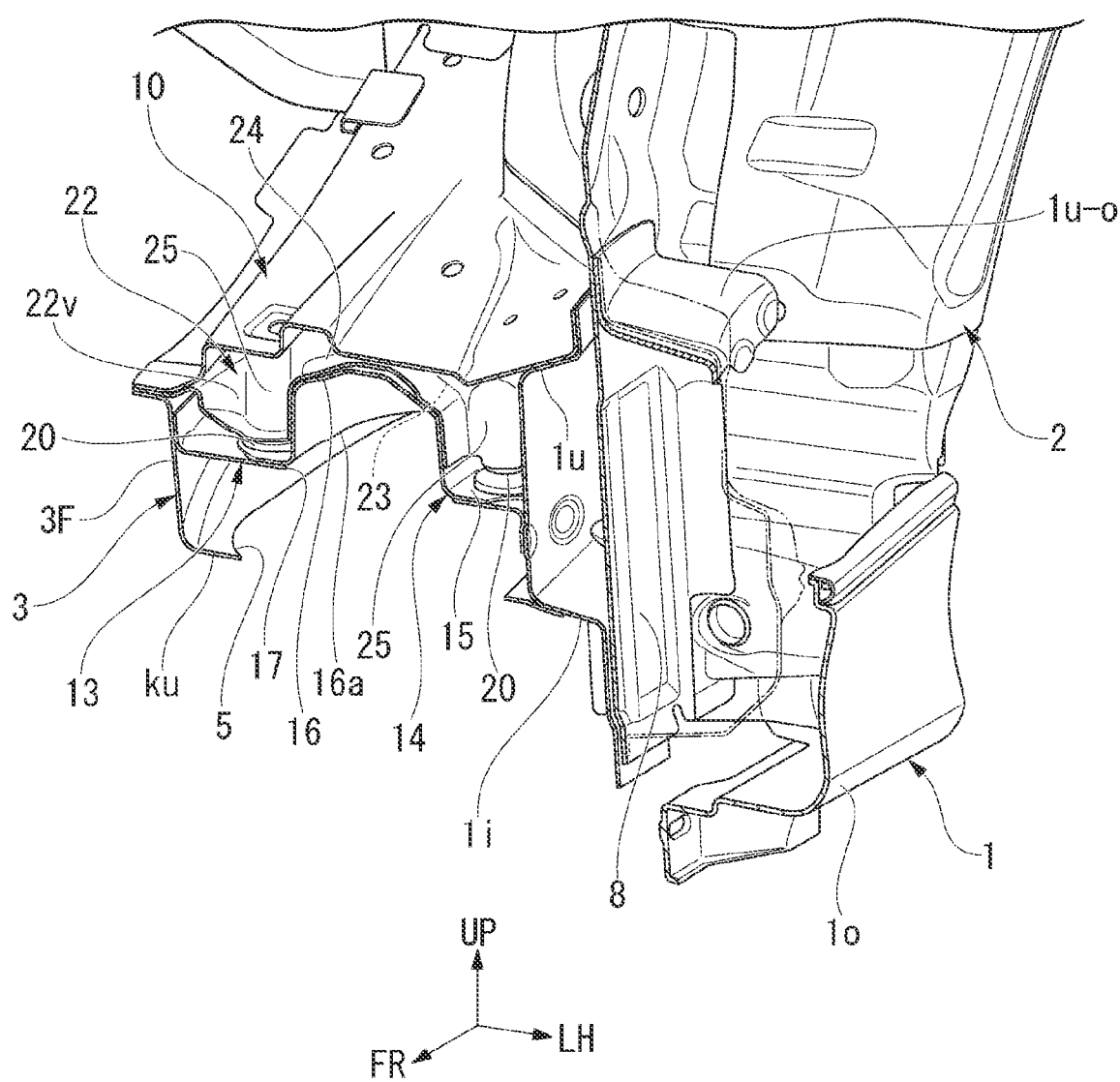
FIG. 7 is a partial cross-sectional perspective view of the vehicle body rear portion of the embodiment, a part of which is cut out along line VI-VI of FIG. 1.
Figure 8:
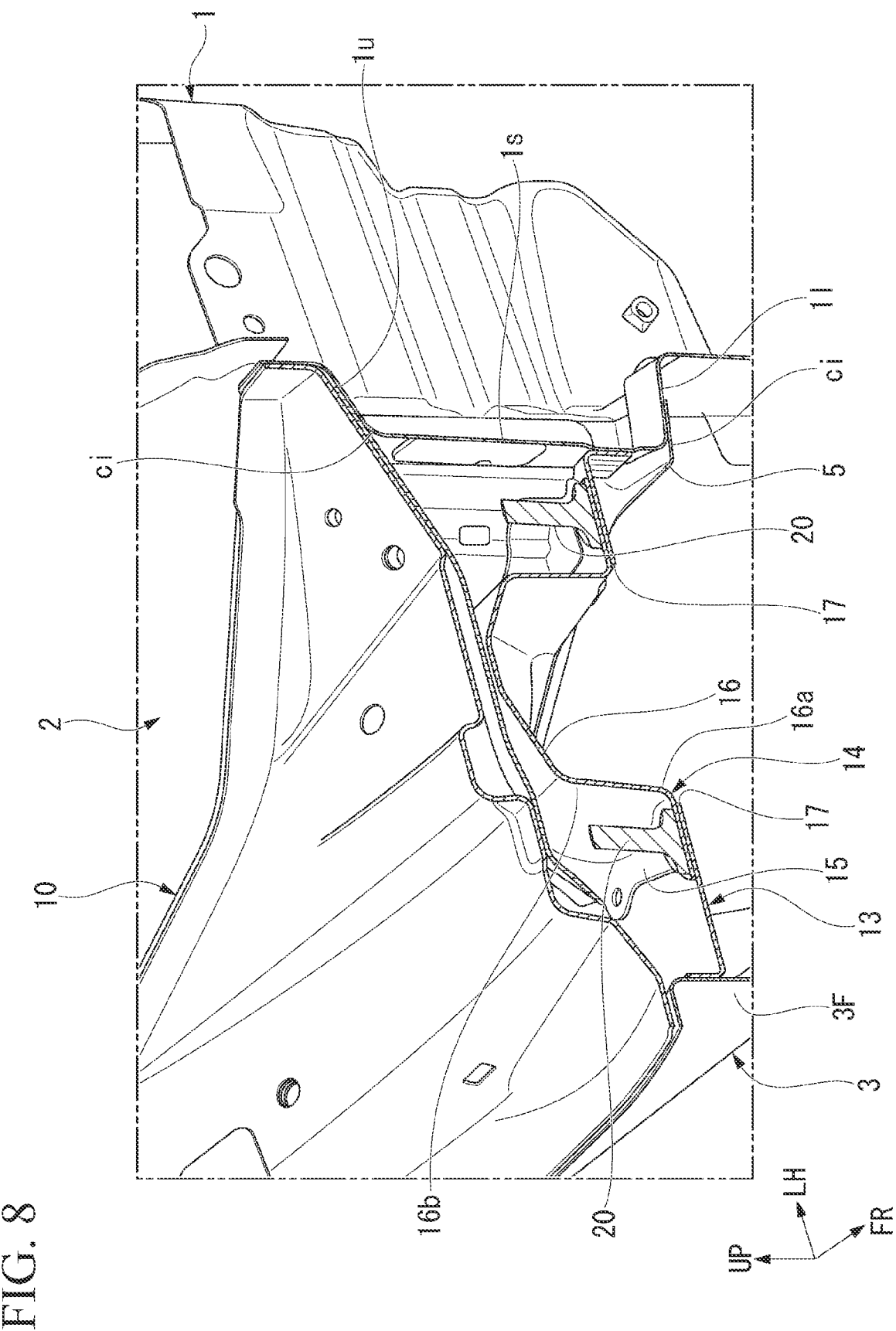
FIG. 8 is a partial cross-sectional perspective view of the vehicle body rear portion of the embodiment, a part of which is cut out along line VIII-VIII of FIG. 1.
Figure 9:
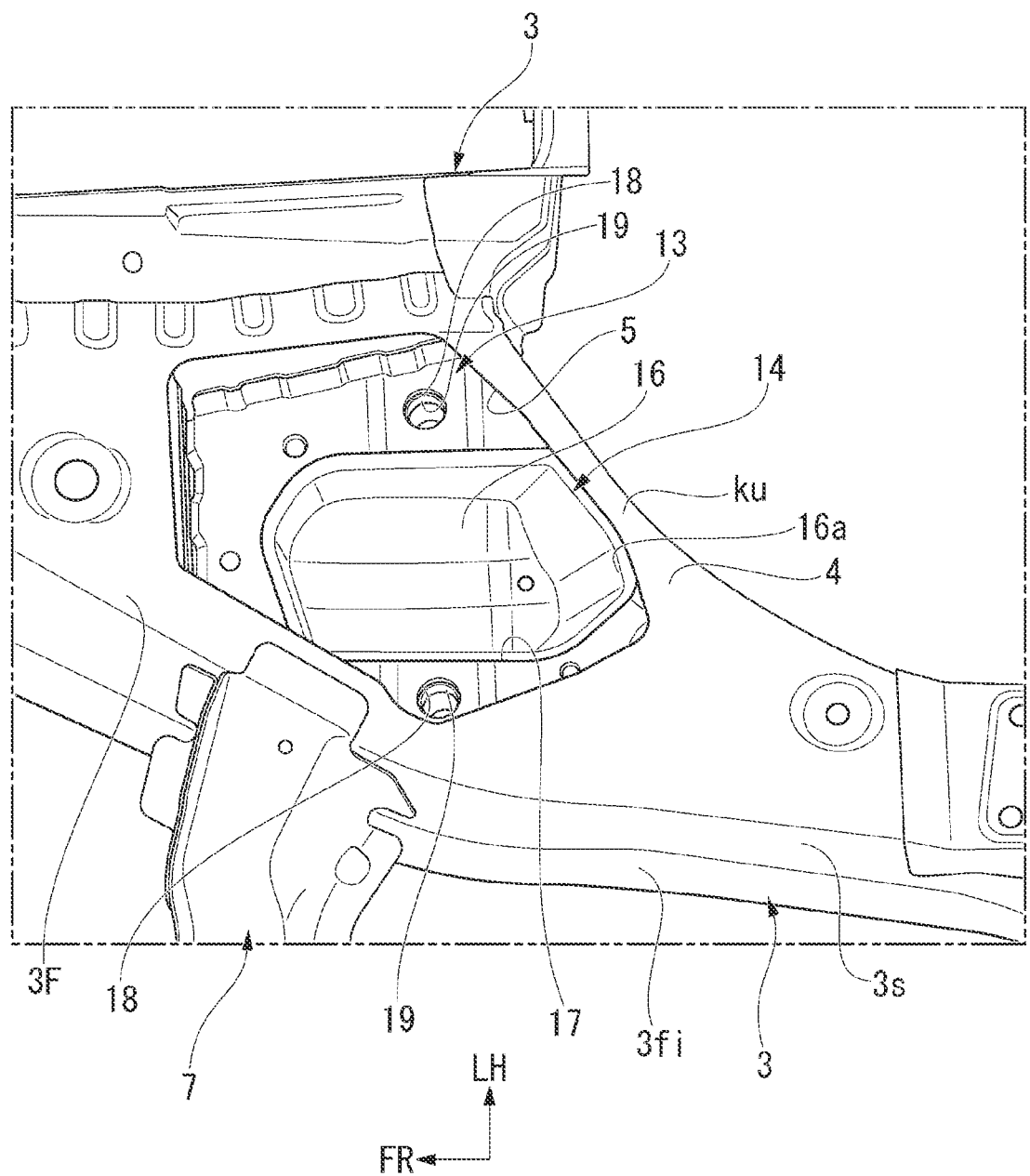
FIG. 9 is a view showing the vehicle body rear portion of the embodiment from below.

FIG. 6 is a cross-sectional view along line VI-VI of FIG. 1. FIG. 7 is a partial cross-sectional perspective view of the left frame portion of the vehicle body rear portion, a part of which is cut out along line VI-VI of FIG. 1. In addition, FIG. 8 is a partial cross-sectional perspective view of the left frame portion of the vehicle body rear portion, a part of which is cut out along line VIII-VIII of FIG. 1. FIG. 9 is a view showing the left frame portion of the vehicle body rear portion from below.

A portion of the front region 3F of the rear side frame 3 curved when seen in a plan view is a kick-up portion ku inclined upward as it goes toward a rear side of the vehicle. The rear side of the kick-up portion ku of the rear side frame 3 extends substantially horizontally toward the rear side of the vehicle. As shown in FIG. 6, FIG. 7 and FIG. 9, an arm insertion hole 5 is formed in a lower wall 4 of the kick-up portion ku. The vehicle of the embodiment employs a trailing arm type rear wheel suspension apparatus. A trailing arm (not shown) of the rear wheel suspension apparatus supports the rear wheel on the rear end side, and the front end side is inserted into the arm insertion hole 5 of the kick-up portion ku. As shown in FIG. 6, a front end portion of the trailing arm is swingably supported in the cross section of the front region 3F (the kick-up portion ku) of the rear side frame 3 via a cylindrical mounting member 9 in which an elastic rubber body 9c is installed.

As shown in FIG. 1 and FIG. 2, a first cross member 6 extending substantially in the vehicle width direction and having both end portions connected to the left and right side sills 1 is disposed in front of the front end portion of the rear side frame 3. In addition, the front regions 3F (the kick-up portions ku) of the left and right rear side frames 3 are connected to each other by a second cross member 7 (a cross member) extending substantially in the vehicle width direction. Further, the rear regions of the left and right rear side frames 3 are connected to each other by a third cross member 75 extending substantially in the vehicle width direction.

As shown in FIG. 6 and FIG. 7, the side sill 1 has an inner side sill 1i and an outer side sill 1o formed in substantially hat shapes and including upper and lower joining flanges, which are joined to each other by the upper and lower joining flanges.

A stiffener 8 crossing the cross section formed by the inner side sill 1i and the outer side sill 1o is interposed between the joining flanges of the inner side sill 1i and the outer side sill 1o.

The inner side sill 1i has internal angle portions ci that are disposed above and below a sidewall 1s. An upper wall 1u of the inner side sill 1i extends outward from the internal angle portion ci on the upper side in the vehicle width direction. A lower wall 1l of the inner side sill 1i extends outward from the internal angle portion ci on the lower side in the vehicle width direction.

The outer side sill 1o includes an upper wall 1u-o inclined slightly obliquely downward from the joining flange on the upper end side toward an outer side in the vehicle width direction. An outer sidewall is-o in the vehicle width direction and a lower wall 1l-o are continuously provided on an outer end portion of the upper wall 1u-o in the vehicle width direction. However, in a cross-sectional portion shown in FIG. 6 and FIG. 7, the sidewall is-o and the lower wall 1l-o are partially cut out. Further, reference sign G in FIG. 6 designates a center of gravity of the side sill 1.

A lower edge portion of a side door 11 on the rear side is disposed on an outer side of the side sill 1 in the vehicle width direction to partially overlap the side sill 1. A door beam 12 is installed in a lower edge portion of the side door 11. The door beam 12 is a metal pipe member extending substantially horizontally in the vehicle forward/rearward direction. The door beam 12 receives the impact load while minimizing excessive deformation of the panel member of the side door 11 when the impact load is input to the side door 11 from an outer side in the vehicle width direction. The door beam 12 is disposed at a position of the lower edge portion of the side door 11 above the center of gravity G of the side sill 1 overlapping the upper region of the outer side sill 1o.

A bracket support metal plate 13 extending in the vehicle forward/rearward direction and the vehicle width direction is fixed into the cross section of the kick-up portion ku of the front region 3F of the rear side frame 3. An arm attachment metal bracket 14 that supports the mounting member 9 is fixed to the upper surface of the bracket support plate 13. The arm attachment bracket 14 has a flat base portion 15 joined to the bracket support plate 13, and a dome-shaped portion 16 bulging to curve upward from a central region of the base portion 15. As shown in FIG. 9, the communication port 17 configured to bring a downward opening 16a of the dome-shaped portion 16 of the arm attachment bracket 14 in communication with the arm insertion hole 5 of the rear side frame 3 is provided in the bracket support plate 13. Bolt insertion holes 18 and 19 (see FIG. 9) passing in the upward/downward direction are formed at corresponding positions of left and right side edge portions of the communication port 17 of the bracket support plate 13 and the base portion 15 of the arm attachment bracket 14. Fixing nuts 20 (collar nuts) are attached to upper surfaces of left and right edge portions of the base portion 15 of the arm attachment bracket 14 through welding or the like.

Here, as shown in FIG. 6, the mounting member 9 has a shaft portion 9b disposed at a position of an axial center of an inner tubular portion 9a, and the inner tubular portion 9a and the shaft portion 9b are connected by the elastic rubber body 9c. Both end portions of the shaft portion 9b passing through the inner tubular portion 9a are fixed to the arm attachment bracket 14 by bolts 21. More specifically, both end portions of the shaft portion 9b of the mounting member 9 are formed flat, and bolt insertion holes (not shown) are formed in the flat portions. Then, shaft portions of the bolts 21 pass through bolt insertion holes of the shaft portion 9b, the bracket support plate 13 and the arm attachment bracket 14 to be fastened to the corresponding fixing nuts 20 of the upper portion of the arm attachment bracket 14. Accordingly, the mounting member 9 is fixed into the cross section of the front region 3F of the rear side frame 3.

As shown in FIG. 3 to FIG. 5, a bracket reinforcement member 22 is integrally attached to the arm attachment bracket 14 on the upper surface side. The bracket reinforcement member 22 is formed by a plate-shaped metal member. The bracket reinforcement member 22 is a plate member with a substantially L-shaped cross section having a vertical standing wall 22v with a substantially right triangular shape having an oblique side h inclined downward from an outer side to an inner side in the vehicle width direction when seen in a front view, and an upper end bent flange 22fu extending from the upper end portion of the vertical standing wall 22v to be bent at a substantially right angle on the rear side of the vehicle. The bracket reinforcement member 22 is fixed to the arm attachment bracket 14 such that a longitudinal direction of the vertical standing wall 22v is oriented in the vehicle width direction.

As shown in FIG. 5, an outer flange 22fo curved at a substantially right angle on the rear side of the vehicle and fixed to the sidewall is of the inner side sill 1i of the side sill 1 (an inner side surface of the side sill 1 in the vehicle width direction) is extended to an outer end portion of the vertical standing wall 22v of the bracket reinforcement member 22 in the vehicle width direction. An outer extension wall 22eo joined to the upper surface of the upper wall 1u of the inner side sill 1i of the side sill 1 is extended to an outer end portion of the upper end bent flange 22fu of the bracket reinforcement member 22 in the vehicle width direction.

The front region 3F of the rear side frame 3 has an inner flange 3fi extending inward in the vehicle width direction and provided on an upper end portion of an inner sidewall in the vehicle width direction that constitutes an upward C-shaped cross section. An inner extension wall 22ei joined to the upper surface of the inner flange 3fi of the rear side frame 3 is extended to an inner end portion of the upper end bent flange 22fu of the bracket reinforcement member 22 in the vehicle width direction. Further, a front flange portion 7u (an upper wall) of the second cross member 7 in the vehicle width direction on the outer side overlaps the lower surface of the inner flange 3fi of the rear side frame 3. The front flange portion 7u of the second cross member 7, the inner flange 3fi of the rear side frame 3 and the inner extension wall 22ei of the bracket reinforcement member 22 are fixed through welding in a state of three layers.

The bracket reinforcement member 22 has an outer end portion in the vehicle width direction that is joined to the vicinity (the upper wall 1u) of the internal angle portions ci above the side sill 1 by the outer extension wall 22eo of the upper end bent flange 22fu. The bracket reinforcement member 22 has an inner end portion in the vehicle width direction that is coupled to the inner flange 3fi of the rear side frame 3 and the outer end portion of the second cross member 7 in the vehicle width direction by the inner extension wall 22ei of the upper end bent flange 22fu.

As shown in FIG. 6, the bracket reinforcement member 22 is disposed above the center of gravity G of the side sill 1 in this state.

In addition, the vertical standing wall 22v of the bracket reinforcement member 22 includes a concave portion 23 fitted onto an outer side surface 16b of the dome-shaped portion 16 of the arm attachment bracket 14. The concave portion 23 is formed to be recessed upward in a substantially arc shape from a lower edge of a substantially central portion of the vertical standing wall 22v in the vehicle width direction. A lower side bent flange 24 joined to the outer side surface 16b of the dome-shaped portion 16 is formed on an edge portion of the concave portion 23. The lower side bent flange 24 is bent toward the front side of the vehicle along the outer side surface 16b of the dome-shaped portion 16. The lower side bent flange 24 overlaps the outer side surface 16b of the dome-shaped portion 16 and is fixed to the outer side surface 16b through welding or the like.

Further, as shown in FIG. 4 and FIG. 5, a longitudinal ridge 30a in the vehicle forward/rearward direction and a lateral ridge 30b in the vehicle width direction are provided on the dome-shaped portion 16. The dome-shaped portion 16 has rigidity that is increased by the longitudinal ridge 30a and the lateral ridge 30b. Only one of the longitudinal ridge 30a and the lateral ridge 30b may be provided, and the number of each of the ridges 30a and 30b is arbitrary.

In addition, nut receiving portions 25 having an arc-shaped cross section extending in the upward/downward direction are provided on both left and right side portions of the concave portion 23 in the vertical standing wall 22v of the bracket reinforcement member 22. An outer surface of the fixing nut 20 attached to the upper surface of the arm attachment bracket 14 is integrally fixed to the nut receiving portion 25 through welding or the like.

The closing plate 10 that closes the rear side frame 3 from above is fixed to the upper portion of the bracket reinforcement member 22 fixed into the cross section of the front region 3F of the rear side frame 3 together with the arm attachment bracket 14. Specifically, the closing plate 10 overlaps a part of the upper surface of the upper end bent flange 22fu of the bracket reinforcement member 22, and the overlapping portions are joined through welding.

When the closing plate 10 and the upper end bent flange 22fu are joined, for example, as shown in FIG. 2, a through-hole 26 is formed in a portion of the closing plate 10 overlapping the upper surface of the upper end bent flange 22fu, and a circumferential edge portion of the through-hole 26 and an upper surface of the upper end bent flange 22fu are fixed through the through-hole 26 through MiG welding or the like. As a result, the upper end bent flange 22fu of the bracket reinforcement member 22 is joined to the closing plate 10 via the welding member.

Further, the closing plate 10 that closes the rear side frame 3 from above has an inner edge portion in the vehicle width direction that is coupled to the inner flange 3fi of the rear side frame 3. The closing plate 10 that closes the rear side frame 3 from above has an outer edge portion in the vehicle width direction that is joined to an outer flange (not shown) of the rear side frame 3 and the upper wall 1u of the inner side sill 1i. In addition, as shown in FIG. 1, the front edge portion of the closing plate 10 is coupled to the upper surface of the first cross member 6 that connects the left and right side sills 1 in front of the rear side frame 3.

In addition, as shown in FIG. 6, an outer upper end portion of the bracket reinforcement member 22 in the vehicle width direction disposed in the cross section of the front region 3F of the rear side frame 3 faces the upper wall 1u-o of the outer side sill 1*o* with the stiffener 8 of the side sill 1 sandwiched therebetween. The upper wall 1*u-o* of the outer side sill 1*o* is inclined slightly downward toward the outer side in the vehicle width direction as described above, and the outer end portion in the vehicle width direction faces the door beam 12 in the side door 11.

In the embodiment, the upper wall 1*u-o* disposed to be inclined downward toward the outer side in the vehicle width direction constitutes a load transmitting portion in the cross section of the side sill 1 configured to transmit the impact load to the bracket reinforcement member 22 when the impact load is input to the door beam 12 from the outer side in the vehicle width direction.

In addition, as shown in FIG. 4, a bulkhead 27 extending downward from a front edge portion of the bracket support plate 13 fixed into the cross section of the front region 3F of the rear side frame 3 is coupled to the front edge portion. The bulkhead 27 extends in the vehicle width direction and the upward/downward direction in the cross section of the front region 3F of the rear side frame 3, and is coupled to the cross section of the front region 3F of the rear side frame 3 and the sidewall of the side sill 1. The bulkhead 27 reinforces the cross section of the front region 3F in the front region 3F of the rear side frame 3 and rigidly couples the lower side of the front region 3F to the side surface of the side sill 1.

Figure 10:
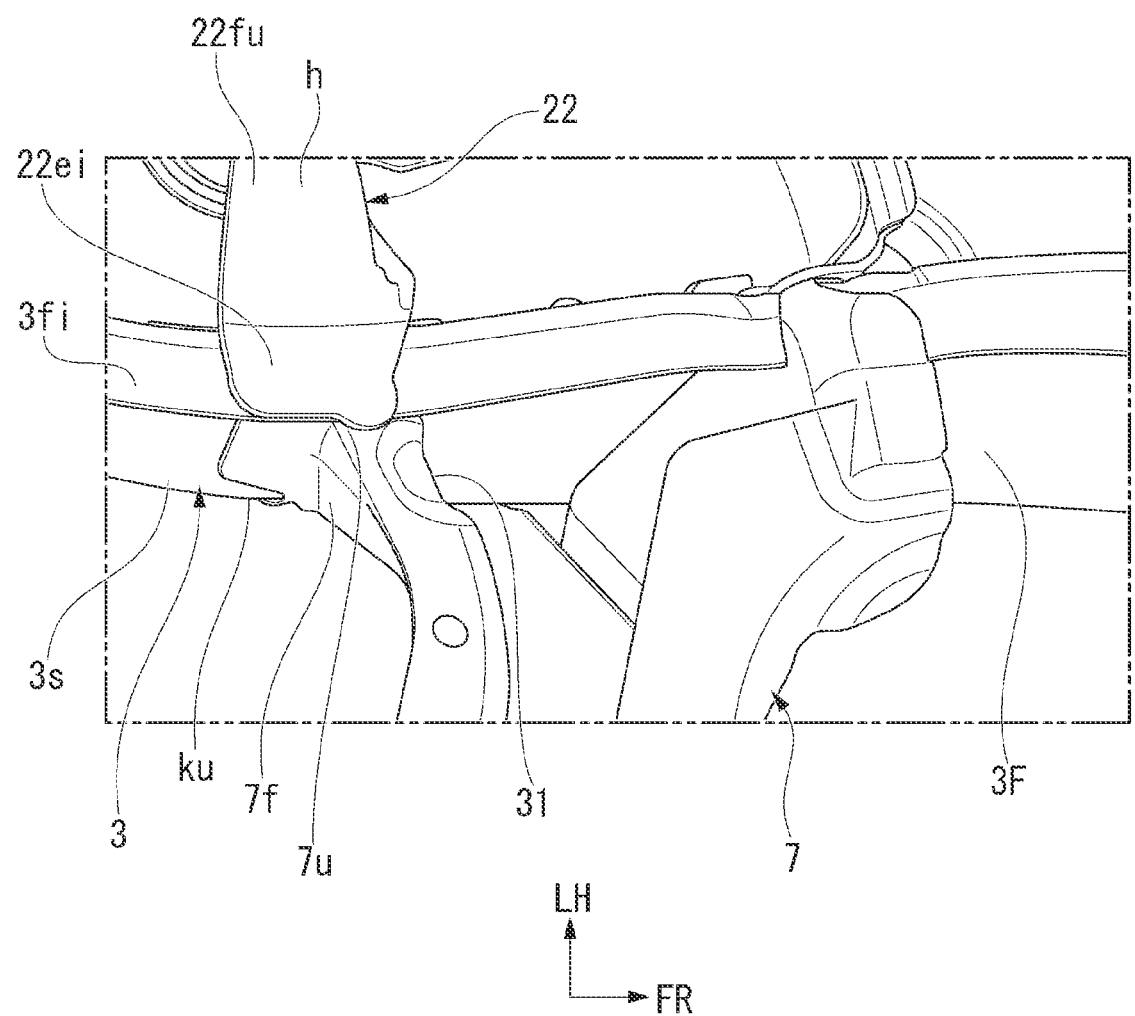
FIG. 10 is a perspective view showing a coupling portion between a second cross member and a rear side frame of the vehicle body rear portion of the embodiment from above.

FIG. 10 is a perspective view showing a coupling portion between the second cross member 7 and the rear side frame 3 from above.

As shown in FIG. 10, the second cross member 7 is formed in a substantially hat-shaped cross-sectional shape that opens upward. The outer end region of the second cross member 7 in the vehicle width direction has a front wall 7*f* (an extension portion) and the front flange portion 7*u* extending to be bent forward from the upper end portion of the front wall 7*f*, which extend to be slightly curved toward the outer side in the vehicle width direction. The outer end portions of the front wall 7*f* and the front flange portion 7*u* in the vehicle width direction butt against the sidewall 3*s* while being perpendicular to an inner sidewall 3*s* of the curved rear side frame 3 in the vehicle width direction. The front wall 7*f* and the front flange portion 7*u* are fixed to an inner side surface of the sidewall 3*s* of the rear side frame 3 in the vehicle width direction and a lower surface of the inner flange 3*fi* through welding. As described above, the front flange portion 7*u* is fixed to the inner flange 3*fi* of the rear side frame 3 and the inner extension wall 22*ei* of the bracket reinforcement member 22 in a state of three layers through welding.

Recessed portions 31 are formed in the vicinity of the outer end portions of the front wall 7*f* and the front flange portion 7*u* of the second cross member 7 in the vehicle width direction to cross the front wall 7*f* and the front flange portion 7*u*. The recessed portion 31 is a weak portion (a fragile portion) with respect to an input load in an extension direction of the second cross member 7, and induces a buckling distortion of the second cross member 7 when an impact load is input to the second cross member 7 in the extension direction.

Figure 11:
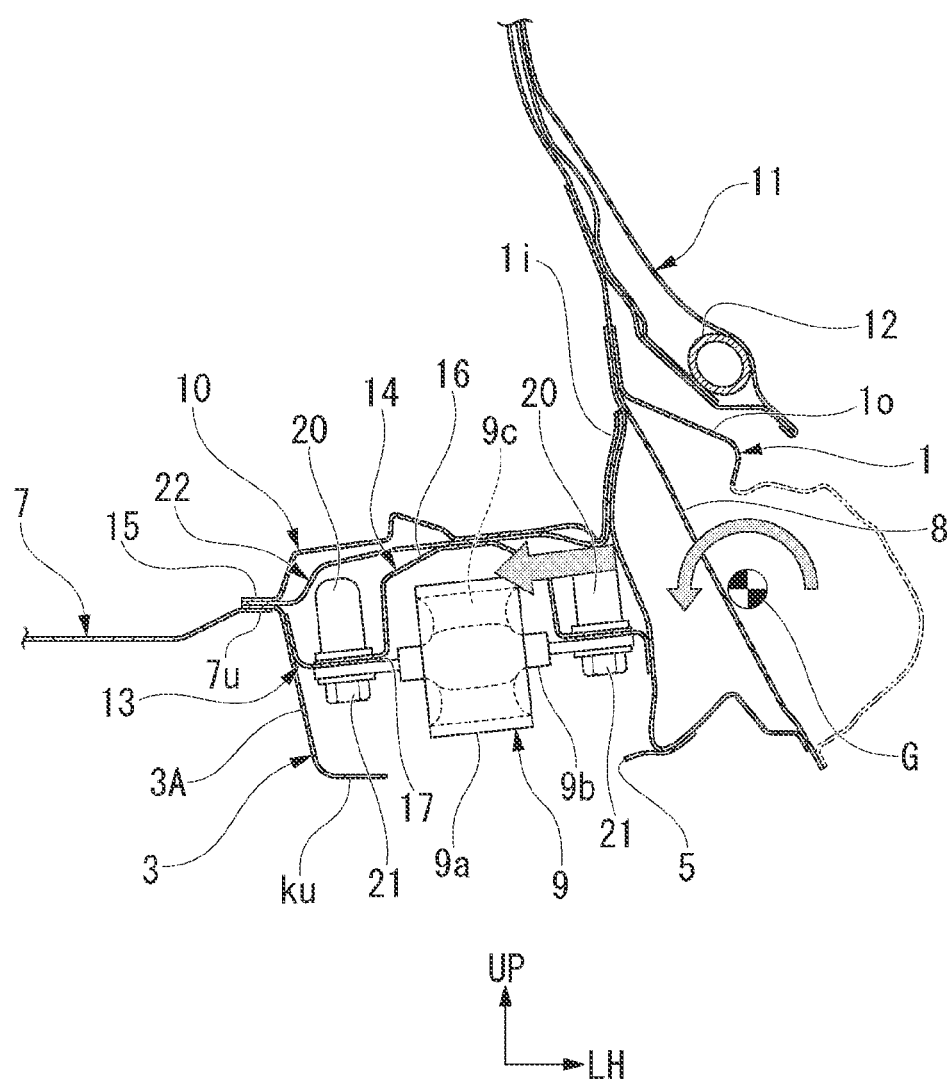
FIG. 11 is a cross-sectional view like FIG. 6 showing a deformation behavior upon input of an impact load to the vehicle body rear portion of the embodiment.

FIG. 11 is the same cross-sectional view as FIG. 6 showing a deformation behavior of the vehicle body rear portion when an impact load directed toward an inner side in the vehicle width direction is input to an outer side of the rear side door 11.

As shown in FIG. 11, when the impact load directed toward the inner side in the vehicle width direction is input to the outer side of the side door 11, the impact load is transmitted to the side sill 1 from the door beam 12 in the side door 11, and further, transmitted to the second cross member 7 through the bracket reinforcement member 22 while crossing the front region 3F of the rear side frame 3 in the vehicle width direction from the side sill 1. For this reason, the impact load input to the side door 11 is efficiently transmitted to the second cross member 7 through the bracket reinforcement member 22.

In addition, since the door beam 12 in the side door 11 is shifted upward from the center of gravity G of the side sill 1, the impact load input to the side sill 1 from the door beam 12 applies a moment shown by an arrow in FIG. 11 to surroundings of the axial center (the center of gravity G) of the side sill 1. However, in the vehicle body rear structure of the embodiment, since the internal angle portions ci above the center of gravity G of the side sill 1 are connected to the outer end portion of the second cross member 7 in the vehicle width direction via the bracket reinforcement member 22, the moment can be efficiently received by the bracket reinforcement member 22. As a result, the upper portion of the side door 11 is suppressed from collapsing inside the vehicle.

Effects of Embodiment

As described above, in the vehicle body rear structure of the embodiment, the end portion of the second cross member 7 extending substantially in the vehicle width direction is connected to the side sill 1 via the front region 3F of the rear side frame 3 and the bracket reinforcement member 22. For this reason, the impact load input to the side door 11 from vehicle body side portion can be efficiently transmitted to the second cross member 7 from the side sill 1 through the bracket reinforcement member 22. Accordingly, when the vehicle body rear structure of the embodiment is employed, surroundings of the connecting portion between the front region 3F of the rear side frame 3 and the side sill 1 can be reduced in size and weight while maintaining high energy absorption performance with respect to the impact load input from the vehicle body side portion.

In addition, in the vehicle body rear structure of the embodiment, the end portion of the second cross member 7 is connected to the internal angle portions ci above the side sill 1 with high rigidity using the bracket reinforcement member 22 that reinforces the arm attachment bracket 14. For this reason, energy absorption performance with respect to the impact load input from the vehicle body side portion can be efficiently increased without causing an increase in the number of new parts.

In addition, in the vehicle body rear structure of the embodiment, since the bracket reinforcement member 22 couples the internal angle portion ci above the side sill 1 and the outer end portion of the second cross member 7 in the vehicle width direction, the upper region of the side door 11 can be suppressed from collapsing in the vehicle by a rotational moment applied to the side sill 1 when the impact load is input from a side of the vehicle.

In particular, in the vehicle body rear structure of the embodiment, since the bracket reinforcement member 22 is disposed above the center of gravity G of the side sill 1, the rotational moment applied to surroundings of the axial center (the center of gravity G) of the side sill 1 can be efficiently received by the bracket reinforcement member 22. For this reason, even when the impact load is input to the side sill 1 above the center of gravity G, collapsing of the upper portion side of the side door 11 by the rotational moment can be efficiently suppressed, and energy of the impact load can be efficiently absorbed by the side sill 1, the front region 3F of the rear side frame 3, the bracket reinforcement member 22, the second cross member 7, and the like.

In addition, the bracket reinforcement member 22 employed in the embodiment is constituted by a substantially L-shaped cross-sectional plate-shaped member having the vertical standing wall 22v formed in a substantially triangular shape with the oblique side h inclined downward from the outer side toward the inner side in the vehicle width direction when seen in a front view and the upper end bent flange 22fu extending to be bent from the upper end portion of the vertical standing wall 22v in the vehicle forward/rearward direction. Then, the outer flange 22fo fixed to the inner side surface of the side sill 1 is provided on the outer end portion of the vertical standing wall 22v in the vehicle width direction, the outer extension wall 22eo fixed to the upper wall 1u of the side sill 1 is provided on the outer end portion of the upper end bent flange 22fu in the vehicle width direction, and the inner extension wall 22ei fixed to the upper surface of the inner flange 3fi of the rear side frame 3 is provided on the inner end portion of the upper end bent flange 22fu in the vehicle width direction.

For this reason, the bracket reinforcement member 22 can be lowered from above to below the assembly of the rear side frame 3 and the side sill 1, the outer extension wall 22eo and the inner extension wall 22ei of the bracket reinforcement member 22 can be placed on the upper surfaces of the upper wall 1u of the side sill 1 and the inner flange 3fi of the rear side frame 3, and the respective parts of the bracket reinforcement member 22 can be easily joined to the side sill 1 and the rear side frame 3 through spot welding or the like.

In addition, as described above, in the bracket reinforcement member 22 joined to the side sill 1 and the rear side frame 3, the oblique side h of the vertical standing wall 22v formed in a substantially right triangular shape connects the internal angle portions ci above the side sill 1 and the inner flange 3fi of the rear side frame 3. For this reason, when the impact load from the side of the vehicle is input, the rotational moment applied to the side sill 1 from the door beam 12 can be efficiently received by the second cross member 7 through the vertical standing wall 22v of the bracket reinforcement member 22 and the inner flange 3fi of the rear side frame 3.

In addition, in the vehicle body rear structure of the embodiment, the vertical standing wall 22v of the bracket reinforcement member 22 includes the concave portion 23 fitted onto the outer side surface of the dome-shaped portion 16 of the arm attachment bracket 14, and the lower side bent flange 24 joined to the outer side surface of the dome-shaped portion 16 is formed on the edge portion of the concave portion 23. For this reason, when the impact load is input from the side of the vehicle, the rotational moment applied to the side sill 1 from the door beam 12 can be received even by the dome-shaped portion 16 of the arm attachment bracket 14 through the vertical standing wall 22v of the bracket reinforcement member 22 and the lower side bent flange 24. Accordingly, when the vehicle body rear structure of the embodiment is employed, the upper region of the side door 11 can be more efficiently suppressed from collapsing in the vehicle.

Further, when the configuration is employed, the impact load directed to the inner side in the vehicle width direction transmitted to the dome-shaped portion 16 through the concave portion 23 of the bracket reinforcement member 22 can be efficiently transmitted to the inner flange 3fi of the rear side frame 3 through the lower side bent flange 24 disposed on the inner side of the dome-shaped portion 16 in the vehicle width direction and the portion of the vertical standing wall 22v connected to the inner side of the lower side bent flange 24 in the vehicle width direction.

Further, in the vehicle body rear structure of the embodiment, the fixing nut 20 configured to fasten the mounting member 9 to the arm attachment bracket 14 using bolts is attached to the arm attachment bracket 14, and the bracket reinforcement member 22 is fixed to the arm attachment bracket 14 and the fixing nut 20.

As a result, the bracket reinforcement member 22 is integrated with the arm attachment bracket 14, and the fixing nut 20 attached to the arm attachment bracket 14 is strongly fixed by the bracket reinforcement member 22. Accordingly, when the configuration is employed, when the impact load is input from the side of the vehicle while enabling an increase in support strength of the trailing arm, the impact load can also be supported by the arm attachment bracket 14 or the trailing arm through the bracket reinforcement member 22 in a distributed manner.

In addition, in the vehicle body rear structure of the embodiment, the bracket support plate 13 is fixed in the cross section of the front region 3F of the rear side frame 3, and the bulkhead 27 extending downward from the front edge portion and connecting the cross section of the front region 3F of the rear side frame 3 and the side sill 1 is coupled to the front edge portion of the bracket support plate 13. For this reason, the front region 3F of the rear side frame 3 can be supported by the lower region of the side sill 1 with high rigidity via the front edge portion of the bracket support plate 13 and the bulkhead 27. Accordingly, when the configuration is employed, the rigidity of the coupling portion between the rear side frame 3 and the side sill 1 can be increased. In addition, when the impact load is input to the rear side frame 3 from the rear side of the vehicle, the input load can be efficiently transmitted to the side sill 1 via the bracket support plate 13 and the bulkhead 27.

In addition, in the vehicle body rear structure of the embodiment, the closing plate 10 that forms the closed cross section is coupled to the rear side frame 3 together with the rear side frame 3, and the upper portion of the bracket reinforcement member 22 is coupled to the closing plate 10. Accordingly, the bracket reinforcement member 22 is integrated with the rear side frame 3 and the closing plate 10 that forms the closed cross section, and support strength of the trailing arm can be increased. In addition, when the impact load is input to the rear side frame 3 from the rear side of the vehicle, the input load can be transmitted to the bracket reinforcement member 22 through not only the rear side frame 3 but also the closing plate 10. Accordingly, when the configuration is employed, the impact load input from the rear side of the vehicle can be efficiently distributed in and supported by the side sill 1 or the second cross member 7 through the bracket reinforcement member 22.

In addition, in the vehicle body rear structure of the embodiment, the upper wall 1u-o (load transmitting portion) of the outer side sill 1o inclined downward toward the outer side in the vehicle width direction and facing the outer upper end portion of the bracket reinforcement member 22 in the vehicle width direction is provided in the cross section of the side sill 1, and the outer end portion of the upper wall 1u-o (load transmitting portion) in the vehicle width direction faces the door beam 12. For this reason, when the impact load directed to the inner side in the vehicle width direction is input to the side sill 1 from the door beam 12, the load can be efficiently transmitted to the bracket reinforcement member 22 through the upper wall 1u-o (load transmitting portion) of the outer side sill 1o in the cross section of the side sill 1. Accordingly, when the configuration is employed, the input impact load can be more reliably received by the bracket reinforcement member 22 and the second cross member 7.

Further, in the vehicle body rear structure of the embodiment, the inner extension wall 22$ei$ of the bracket reinforcement member 22 is joined to the front flange portion 7$u$ (upper wall) of the second cross member 7 via the inner flange 3$fi$ of the rear side frame 3. For this reason, the inner extension wall 22$ei$ of the bracket reinforcement member 22 overlaps the inner flange 3$fi$ of the rear side frame 3 and the front flange portion 7$u$ of the second cross member 7, and the three members can be joined in a state of three layers through spot welding or the like. Accordingly, when the configuration is employed, productivity of the vehicle can be increased. In addition, in the configuration, since the three members are joined in the state of three layers, strength of the joining portion can be efficiently increased.

In addition, in the vehicle body rear structure of the embodiment, the front wall 7$f$ and the front flange portion 7$u$ (extension portion) extending to be perpendicular to the inner side surface of the rear side frame 3 in the vehicle width direction and coupled to the rear side frame 3 are provided on the outer end portion of the second cross member 7 in the vehicle width direction, and the recessed portions 31 that are fragile portions are provided in parts of the front wall 7$f$ and the front flange portion 7$u$. For this reason, when the impact load is input to the side sill 1 from the outer side in the vehicle width direction, the impact load is transmitted to the front wall 7$f$ and the front flange portion 7$u$ (extension portion) of the second cross member 7 via the rear side frame 3 in the extension direction. For this reason, the impact load can be efficiently transmitted to the second cross member 7 from the side sill 1. In addition, when the impact load is input to the front wall 7$f$ and the front flange portion 7$u$ of the second cross member 7 via the rear side frame 3, the front wall 7$f$ and the front flange portion 7$u$ can be plastically deformed from the recessed portion 31 that is a fragile portion as a starting point, and energy of the impact load can be efficiently absorbed.

Further, the present invention is not limited to the above-mentioned embodiment and various design changes may be made without departing from the scope of the present invention.

For example, while the outer end portion of the bracket reinforcement member 22 in the vehicle width direction is directly coupled to the vicinity of the internal angle portions $ci$ above the side sill 1 in the embodiment, the outer end portion of the bracket reinforcement member 22 in the vehicle width direction may be indirectly coupled to the vicinity of the internal angle portions $ci$ above the side sill 1 via a separate member. In addition, while the inner end portion of the bracket reinforcement member 22 in the vehicle width direction is indirectly coupled to the outer end portion of the second cross member 7 (cross member) in the vehicle width direction via the inner flange 3$fi$ of the rear side frame 3 in the embodiment, the inner end portion of the bracket reinforcement member 22 in the vehicle width direction may be directly coupled to the outer end portion of the second cross member 7 (cross member) in the vehicle width direction.

What is claimed is:

1. A vehicle body rear structure comprising:
   a side sill disposed below a side portion of a passenger compartment substantially in a vehicle forward/rearward direction;
   a rear side frame having a front region coupled to an inner side of a rear portion of the side sill in a vehicle width direction and an arm insertion hole provided on a lower wall of the front region;
   a cross member extending substantially in a vehicle width direction and having an outer end portion in the vehicle width direction connected to the front region of the rear side frame;
   a side door in which a door beam is installed at a position overlapping an outer side of the side sill in the vehicle width direction;
   a trailing arm configured to support a rear wheel on a side of the rear portion and having a front end portion inserted through the arm insertion hole of the rear side frame and swingably supported by the front region of the rear side frame via a mounting member;
   an arm attachment bracket having a dome-shaped portion that covers the mounting member from above and fixed into a cross section of the front region of the rear side frame to support the mounting member; and
   a bracket reinforcement member attached to the arm attachment bracket and configured to reinforce the arm attachment bracket,
   wherein the bracket reinforcement member has an outer end portion in the vehicle width direction that is directly or indirectly coupled to a vicinity of an internal angle portion above the side sill, and an inner end portion in the vehicle width direction that is directly or indirectly coupled to an outer end portion of the cross member in the vehicle width direction.

2. The vehicle body rear structure according to claim 1, wherein the bracket reinforcement member is disposed above a center of gravity of the side sill.

3. The vehicle body rear structure according to claim 1, wherein the bracket reinforcement member is a substantially L-shaped cross-sectional plate-shaped member having a vertical standing wall with an oblique side inclined downward from an outer side toward an inner side in the vehicle width direction and a substantially right triangular shape when seen in a front view, and an upper end bent flange extending to be bent from an upper end portion of the vertical standing wall in the vehicle forward/rearward direction,
   an outer flange fixed to an inner side surface of the side sill in the vehicle width direction is provided on an outer end portion of the vertical standing wall in the vehicle width direction,
   an outer extension wall fixed to an upper wall connected to the internal angle portion of the side sill is provided on an outer end portion of the upper end bent flange in the vehicle width direction, and
   an inner extension wall fixed to an upper surface of an inner flange of the rear side frame in the vehicle width direction is provided on an inner end portion of the upper end bent flange in the vehicle width direction.

4. The vehicle body rear structure according to claim 3, wherein the vertical standing wall has a concave portion fitted onto an outer side surface of the dome-shaped portion of the arm attachment bracket, and
   a lower side bent flange joined to the outer side surface of the dome-shaped portion is formed on an edge portion of the concave portion.

5. The vehicle body rear structure according to claim 3, wherein a fixing nut configured to fasten the mounting member to the arm attachment bracket using a bolt is attached to the arm attachment bracket, and the bracket reinforcement member is fixed to the arm attachment bracket and the fixing nut.

6. The vehicle body rear structure according to claim 1, wherein a bracket support plate extending in the vehicle forward/rearward direction and the vehicle width direction and configured to support the arm attachment bracket is fixed into a cross section of the front region of the rear side frame, a communication port configured to bring a downward opening of the dome-shaped portion of the arm attachment bracket in communication with the arm insertion hole of the rear side frame is provided on the bracket support plate, and a bulkhead extending downward from the front edge portion and configured to connect the cross section of the front region of the rear side frame and the side sill is coupled to a front edge portion of the bracket support plate.

7. The vehicle body rear structure according to claim 6, wherein a main part of the rear side frame is formed in a substantially C-shaped cross-sectional shape that opens upward, a closing plate that forms a closed cross section together with the rear side frame is coupled to the rear side frame, and an upper portion of the bracket reinforcement member is coupled to the closing plate.

8. The vehicle body rear structure according to claim 1, wherein a load transmitting portion inclined downward toward an outer side in the vehicle width direction and facing an outer upper end portion of the bracket reinforcement member in the vehicle width direction is provided in the cross section of the side sill, and an outer end portion of the load transmitting portion in the vehicle width direction faces the door beam.

9. The vehicle body rear structure according to claim 3, wherein the inner extension wall of the bracket reinforcement member is joined to an outer upper wall of the cross member in the vehicle width direction via the inner flange of the rear side frame.

10. The vehicle body rear structure according to claim 3, wherein an extension portion extending to be perpendicular to an inner side surface of the rear side frame in the vehicle width direction and coupled to the rear side frame is provided on an outer end portion of the cross member in the vehicle width direction, and a fragile portion is provided in a part of the extension portion.

* * * * *